United States Patent
Takenami (10) Patent No.: US 11,084,171 B2
(45) Date of Patent: Aug. 10, 2021

(54) TOOL POSTURE CONTROL APPARATUS

(71) Applicant: FANUC CORPORATION, Yamanashi (JP)

(72) Inventor: Mototsugu Takenami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 319 days.

(21) Appl. No.: 16/185,599

(22) Filed: Nov. 9, 2018

(65) Prior Publication Data
US 2019/0152062 A1    May 23, 2019

(30) Foreign Application Priority Data

Nov. 22, 2017 (JP) .............................. JP2017-224108
Aug. 31, 2018 (JP) .............................. JP2018-163844

(51) Int. Cl.
*B25J 9/16* (2006.01)

(52) U.S. Cl.
CPC ............ *B25J 9/1694* (2013.01); *B25J 9/1664* (2013.01); *G05B 2219/37281* (2013.01); *G05B 2219/37425* (2013.01); *G05B 2219/37618* (2013.01); *G05B 2219/40623* (2013.01)

(58) Field of Classification Search
CPC .................. B25J 9/1694; B25J 9/1664; G05B 2219/37281; G05B 2219/37425; G05B 2219/37618; G05B 2219/40623
See application file for complete search history.

(56) References Cited

U.S. PATENT DOCUMENTS

| 2010/0204817 A1* | 8/2010 | Fujita ..................... B25J 9/1684 700/159 |
| 2011/0260033 A1 | 10/2011 | Steffensen et al. |
| 2012/0120415 A1 | 5/2012 | Steffensen et al. |
| 2012/0206716 A1 | 8/2012 | Cramer et al. |
| 2012/0210802 A1 | 8/2012 | Sarh et al. |
| 2016/0318120 A1* | 11/2016 | Okada .................. B23K 20/123 |

(Continued)

FOREIGN PATENT DOCUMENTS

| EP | 2189256 B1 | 5/2010 |
| EP | 2492065 A1 | 8/2012 |
| EP | 3090828 A1 | 11/2016 |

(Continued)

OTHER PUBLICATIONS

Japanese Notice of Reasons for Refusal dated Feb. 4, 2020, for Japanese Patent Application No. 2018163844.

*Primary Examiner* — Khoi H Tran
*Assistant Examiner* — Nhi Q Bui
(74) *Attorney, Agent, or Firm* — Karceski IP Law, PLLC (57) ABSTRACT

A tool posture control apparatus includes a robot which supports a tool for performing a predetermined task on a target object, the robot capable of changing posture of the tool; a sensor supported by the robot; and a control device which changes the posture of the tool by controlling the robot, where the sensor measures a distance between the target object and a respective at a plurality of measurement reference positions around the tool, and the control device performs posture control process of controlling the robot in such a way that a measured-distance difference that is a difference between the distances measured by the sensor comes close to a target value.

6 Claims, 7 Drawing Sheets

(56) References Cited

U.S. PATENT DOCUMENTS

2017/0173796 A1   6/2017  Kim et al.

FOREIGN PATENT DOCUMENTS

| | | |
|---|---|---|
| JP | H01257579 A | 10/1989 |
| JP | H02287705 A | 11/1990 |
| JP | H04300180 A | 10/1992 |
| JP | H0557541 A | 3/1993 |
| JP | H06170771 A | 6/1994 |
| JP | 2005-114549 A | 4/2005 |
| JP | 2009066713 A | 4/2009 |
| JP | 2012171093 A | 9/2012 |
| JP | 2014-508931 A | 4/2014 |
| JP | 2014-232113 A | 12/2014 |
| JP | 2017-044540 A | 3/2017 |
| WO | 2012125671 A1 | 9/2012 |
| WO | 2015097727 A1 | 3/2017 |

\* cited by examiner

TOOL POSTURE CONTROL APPARATUS

CROSS-REFERENCE TO RELATED APPLICATIONS

This application is based on and claims priority to Japanese Patent Application No. 2017-224108, filed on Nov. 22, 2017, and Japanese Patent Application No. 2018-163844, filed on Aug. 31, 2018, the entire contents of both of which are incorporated herein by reference.

FIELD OF THE INVENTION

The present invention relates to a tool posture control apparatus for controlling posture of a tool that is supported by a tool support device.

BACKGROUND OF THE INVENTION

As a device for measuring a distance between two planes that face each other, there is known a device which includes a bar-shaped measurement device main body which is arranged between two planes that face each other, in a manner extending in a direction perpendicular to the planes, a plurality of first distance measurement sensors that are arranged at one end of the measurement device main body while being spaced apart around a longitudinal axis of the measurement device main body, and a plurality of second distance measurement sensors that are arranged on the other end of the measurement device main body while being spaced apart around the longitudinal axis of the measurement device main body, where posture of the measurement device main body is adjusted by using measurement values of the plurality of first distance measurement sensors and the plurality of second distance measurement sensors (see Japanese Unexamined Patent Application, Publication No. 2017-044540, for example).

SUMMARY OF THE INVENTION

A tool posture control apparatus according to an aspect of the present invention includes a tool support device which supports a tool for performing a predetermined task on a target object, the tool support device capable of changing posture of the tool; a sensor supported by the tool support device; and a control device which changes the posture of the tool by controlling the tool support device, wherein the sensor measures distances between the target object and three or more measurement reference positions around the tool, respectively, and the control device performs a posture control process of controlling the tool support device in such a way that a measured-distance difference that is a difference between the distances measured by the sensor comes close to a target value that is determined according to a result of calculation based on three-dimensional shape data of the target object.

DESCRIPTION OF EMBODIMENT(S) OF THE INVENTION

A tool posture control apparatus according to an embodiment of the present invention will be described below with reference to the drawings.

Figure 1:
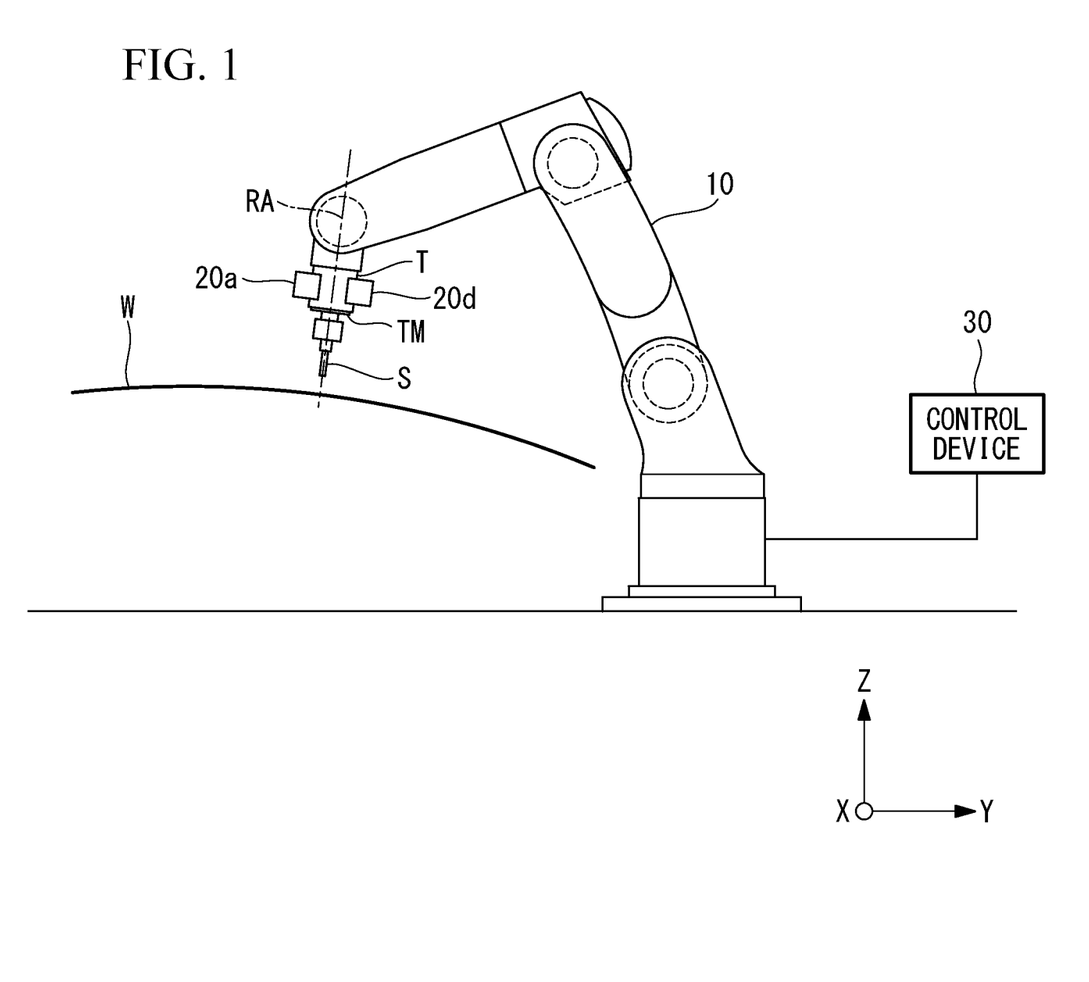
FIG. 1 is a schematic configuration diagram of a tool posture control apparatus according to an embodiment of the present invention.

As shown in FIG. 1, the tool posture control apparatus includes a robot 10 as a tool support device for supporting a tool T that performs a predetermined task on a target object W, while allowing posture of the tool T to be changed, a plurality of (in the present embodiment, four) sensors 20a, 20b, 20c, 20d which are distance measurement sensors that are supported around the tool T by the robot 10, and a control device 30 for changing the posture of the tool T by controlling the robot 10.

Figure 2:
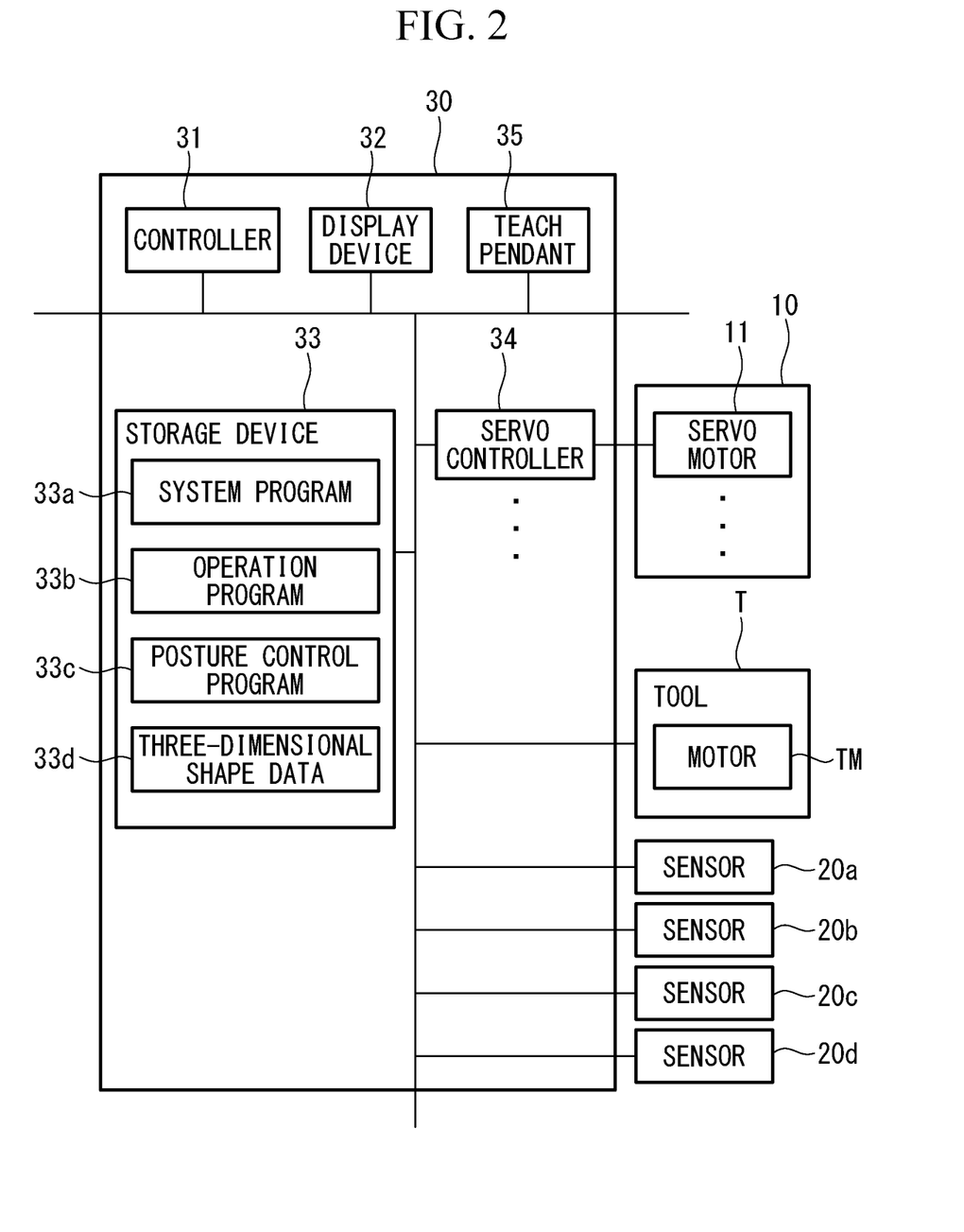
FIG. 2 is a block diagram of a control device according to the present embodiment.

The robot 10 includes a plurality of arm members and joints, and also includes a plurality of servo motors 11 that drive respective joints (see FIG. 2). Various servo motors, such as rotary motors and direct drive motors, may be used as the servo motors 11. Each servo motor 11 has a built-in operation position detection device, such as an encoder, for detecting an operation position of the servo motor 11, and detection values of the operation position detection devices are transmitted to the control device 30.

The tool T is attached to a tip end portion of the robot 10, and a predetermined task is performed on a target object W by the tool T. In the present embodiment, the robot 10 performs, by the tool T, a task of inserting and tightening a screw S into a hole (not shown) provided on a surface of the target object W. The tool T is provided with a cartridge (not shown) for sequentially supplying the screws S, and a motor TM for causing rotation of the screw S so that the screw S set in the tool T is screwed. The motor TM is connected to the control device 30, and is controlled by the control device 30.

Each sensor 20a, 20b, 20c, 20d is for measuring a distance to the target object W, and may be a known optical displacement sensor, such as a laser displacement meter, a known ultrasonic displacement sensor, or a known contact-type displacement sensor, for example. Each sensor 20a, 20b, 20c, 20d is supported by the robot 10 through the tool T. That is, in the present embodiment, each sensor 20a, 20b, 20c, 20d is attached to the tool T.

Figure 3:
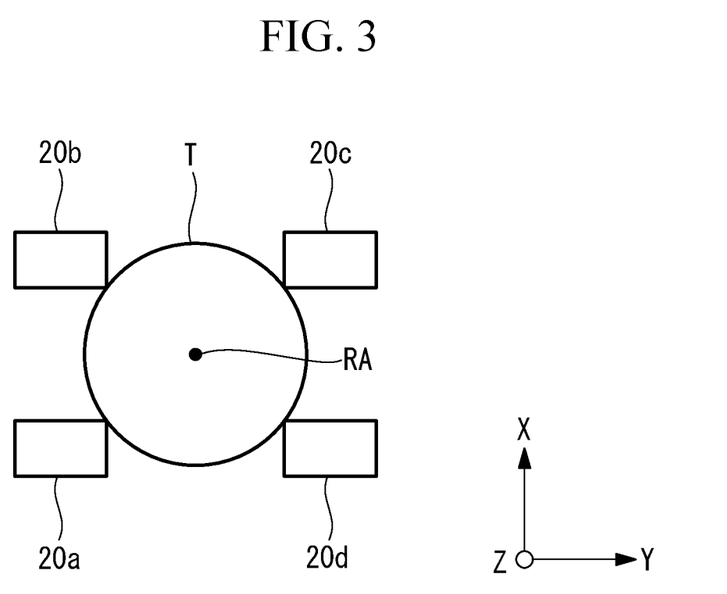
FIG. 3 is a diagram showing an arrangement of sensors according to the present embodiment.

In the present embodiment, each sensor 20a, 20b, 20c, 20d is a laser displacement meter, and radiates laser light in a direction of insertion of the screw S by the tool T. As shown in FIG. 3, the plurality of sensors 20a, 20b, 20c, 20d are arranged around a rotation axis RA of the tool T at substantially equal intervals.

In the present embodiment, positions of the sensors 20a, 20b, 20c, 20d along a direction of the rotation axis RA of the tool T are the same, and distances from the rotation axis RA of the tool T to the sensors 20a, 20b, 20c, 20d are also the same. Each sensor 20a, 20b, 20c, 20d is connected to the control device 30, and measurement values of the sensors 20a, 20b, 20c, 20d are transmitted to the control device 30.

As shown in FIG. 2, the control device 30 includes a controller 31 including a CPU, a RAM and the like, a display device 32, a storage device 33 including a non-volatile storage, a ROM, or the like, a plurality of servo controllers 34 provided so as to respectively correspond to the servo motors 11 of the robot 10, and a teach pendant 35 which is connected to the control device 30 and which can be carried by an operator. The teach pendant 35 may be configured to wirelessly communicate with the robot control device 30.

The storage device 33 stores a system program 33a, and the system program 33a realizes basic functions of the control device 30. The storage device 33 also stores an operation program 33b and posture control program 33c, and further stores data of a surface shape of the target object W, such as three-dimensional shape data 33d. The three-dimensional shape data 33d is based on CAD data, for example, and is information of a three-dimensional shape of the target object W which is located at a predetermined position relative to the robot 10, as shown in FIG. 1.

The controller 31 operates according to the system program 33a, and when performing a task on the target object W, the controller 31 reads out the operation program 33b stored in the storage device 33 and temporarily stores the operation program 33b in the RAM, and transmits control signals to the servo controllers 34 according to the read-out operation program 33b, and thereby controls the servo amplifiers of the servo motors 11 of the robot 10, and also, transmits a control signal to the motor TM of the tool T.

The operation program 33b is set to sequentially insert and tighten the screws S into a plurality of holes formed on the surface of the target object W. That is, the operation program 33b is set to arrange the screws S to face the respective holes, and from this state, to insert and tighten the screws S into the holes. After the controller 31 operates according to the operation program 33b to arrange the screw S to face the corresponding hole, the controller 31 operates according to the posture control program 33c, and controls the posture of the tool T relative to the target object W. Operation of the controller 31 at this time is described below with reference to the flowchart in FIG. 4.

Figure 4:
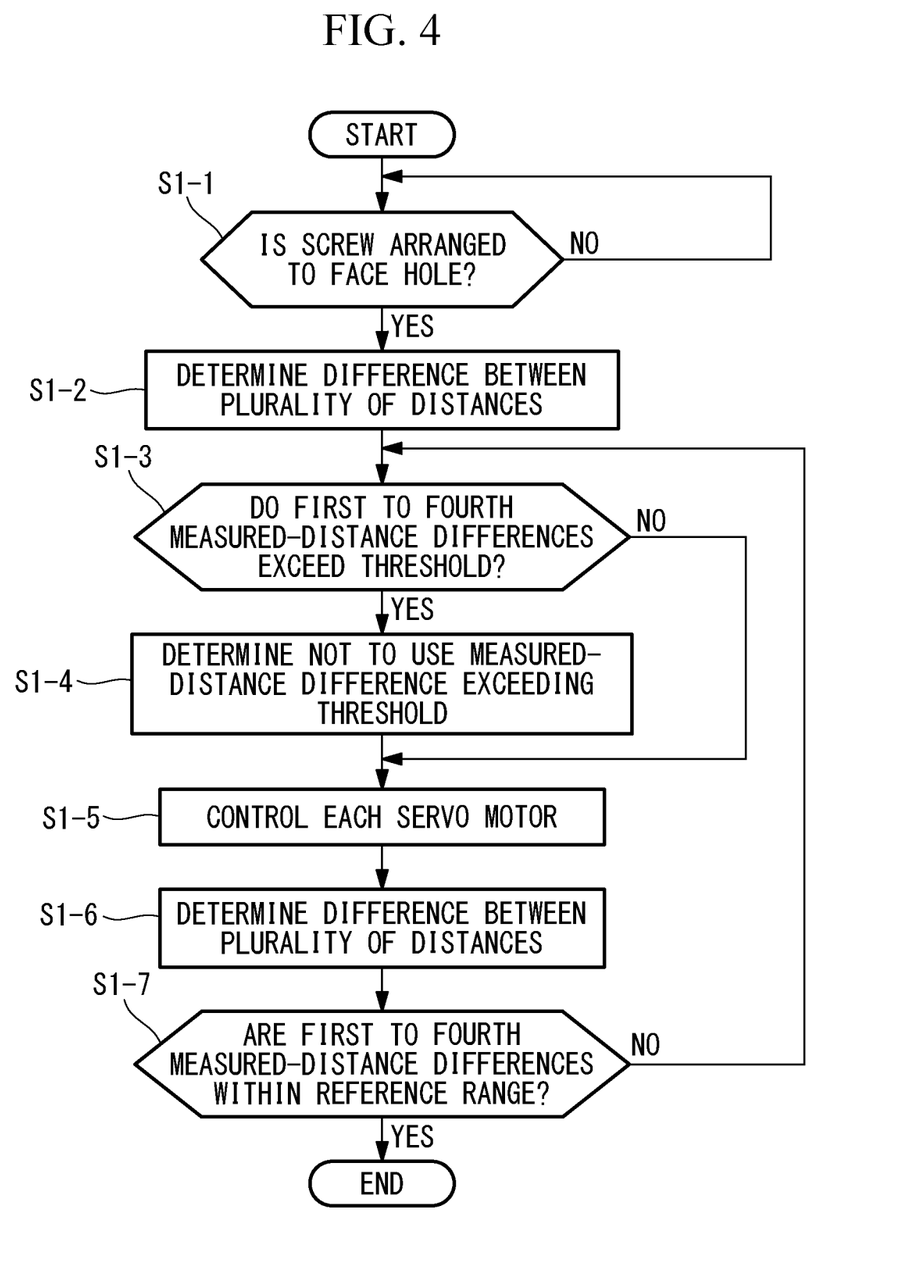
FIG. 4 is a flowchart showing an example of control by the control device according to the present embodiment.

First, when the screw S is arranged to face the hole (S1-1), the controller 31 operates according to the posture control program 33c, and determines differences between a plurality of distances measured by the plurality of sensors 20a, 20b, 20c, 20d (S1-2). For example, a first measured-distance difference, which is a difference between distances measured respectively by the sensors 20a, 20b, and 20c, a second measured-distance difference, which is a difference between distances measured respectively by the sensors 20b, 20c, and 20d, a third measured-distance difference, which is a difference between distances measured respectively by the sensors 20c, 20d, and 20a, and a fourth measured-distance difference, which is a difference between distances measured respectively by the sensors 20d, 20a, and 20b, are determined.

In the present embodiment, a surface of the target object W has a spherical surface having a specific curvature, for example. In this case, an inclination angle of the rotation axis RA of the tool T and a direction thereof with respect to a normal of the spherical surface may be determined based on the first to fourth measured-distance differences, and when the first to fourth measured-distance differences each becomes a target value (in this case, zero) which is determined according to a result of calculation based on the three-dimensional shape data of the target object W, the rotation axis RA of the tool T is extending along a normal direction of the spherical surface. Even when the surface of the target object W is a curved surface with varying curvature, the inclination angle of the rotation axis RA of the tool T and the direction thereof with respect to a normal at a target position on the curved surface may be determined by comparing the first to fourth measured-distance differences with results calculated from the three-dimensional shape data 33d.

The first measured-distance difference may include a difference between the measured distance of the sensor 20a and the measured distance of the sensor 20b, and a difference between the measured distance of the sensor 20b and the measured distance of the sensor 20c. In the case where the sensor 20a and the sensor 20b are aligned in an X-axis direction, and the sensor 20b and the sensor 20c are aligned in a Y-axis direction orthogonal to an X-axis, a difference between the measured distance of the sensor 20a and the measured distance of the sensor 20b corresponds to inclination of the tool T with respect to the X-axis direction, and a difference between the measured distance of the sensor 20b and the measured distance of the sensor 20c corresponds to inclination of the tool T with respect to the Y-axis direction. The same thing can be said for the second to fourth measured-distance differences.

Figure 5:
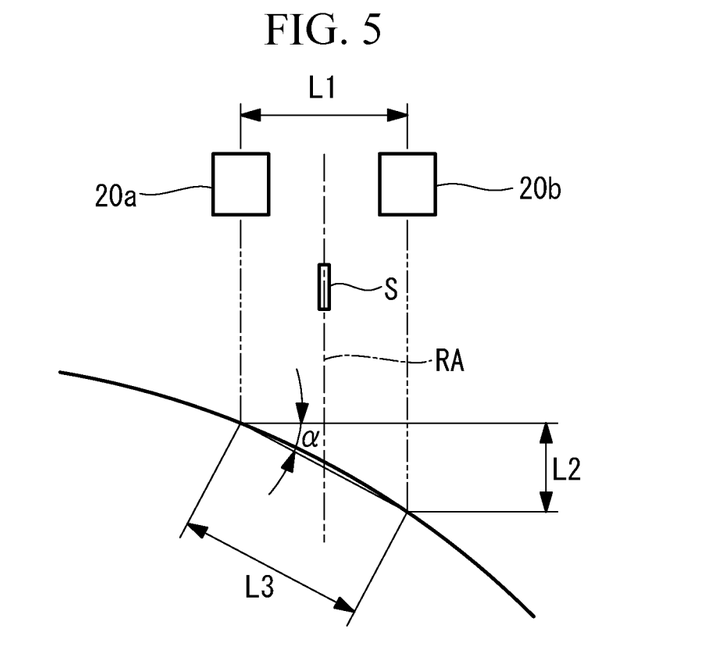
FIG. 5 is a diagram showing an example of calculation of inclination of a tool by the tool posture control apparatus according to the present embodiment.

The difference between the measured distance of the sensor 20a and the measured distance of the sensor 20b included in the first measured-distance difference is shown in FIG. 5. As shown in FIG. 5, if an optical axis of laser light from the sensor 20a and an optical axis of laser light from the sensor 20b are substantially parallel to each other, an inclination α of the rotation axis RA of the tool T with respect to the X-axis direction may be determined by calculation of arctangent (L2/L1) by using a distance L1 between the sensor 20a and the sensor 20b in the X-axis direction and a difference L2 between the measured distance of the sensor 20a and the measured distance of the sensor 20b.

In practice, the optical axis of the laser light from the sensor 20a and the optical axis of the laser light from the sensor 20b are, in many cases, not completely parallel. In this case, a distance L3, on the surface of the target object W, between an irradiation position of the laser light from the sensor 20a and an irradiation position of the laser light from the sensor 20b may be measured, and the inclination α of the rotation axis RA of the tool T with respect to the X-axis direction may be determined by calculation of arcsin (L2/L3) by using the distance L3. Additionally, an actual measurement value of the distance L3 may be obtained at several positions, and the actual measurement values may be used to calculate an inclination α at other positions.

Next, whether the first to fourth measured-distance differences each exceeds a threshold with respect to a target value that is based on the three-dimensional shape data of the target object W is determined (step S1-3). Then, in the case where there is a measured-distance difference that exceeds the predetermined threshold, such as in the case where the difference between the measured distances of the sensor 20d and the sensor 20a or the difference between the measured distances of the sensors 20d, 20a and 20b included in the fourth measured-distance difference exceeds the threshold, it is determined that the measured-distance difference (the fourth measured-distance difference) is not to be used (step S1-4).

Next, the first to third measured-distance differences, which are not excluded in step S1-4, are used, and a control signal is transmitted to each servo controller 34 so as to cause the measured-distance differences to come close to a target value that are based on the three-dimensional shape data of the target object W, and the servo amplifier of each servo motor 11 of the robot 10 is thereby controlled (step S1-5). At this time, control is performed such that the direction of the rotation axis RA of the tool T faces the hole of the target object W.

In the case of the present embodiment, the surface of the target object W is a spherical surface having specific curvature, and thus, zero is used as the target value of the measured-distance difference. In the case where the surface of the target object W is a curved surface with varying curvature, the target value of the measured-distance difference is set according to the three-dimensional shape data 33d.

Next, the first to fourth measured-distance differences are determined as in step S1-2 (step S1-6), and whether the first to fourth measured-distance differences fall within a reference range is determined (step S1-7). At this time, processes in step S1-3 and S1-4 may be performed. The reference range is set to a range where the inclination of the rotation axis RA of the tool T with respect to the normal of the surface of the target object W does not become a problem for tightening of the screw S.

Subsequently, if the result of determination in step S1-7 is NO, steps S1-3 to S1-6 are repeated. In the case where the result of determination in step S1-7 is YES, adjustment of the posture of the tool T with respect to the target object W is ended, and the controller 31 operates according to the operation program 33b, and the screw S is thus inserted and screwed into the hole.

As described above, according to the present embodiment, a distance between the target object W and each of four measurement reference positions, which are positions of the sensors 20a, 20b, 20c, 20d, is measured by the respective sensor 20a, 20b, 20c, 20d, which is supported around the tool T by the robot 10, and the first to fourth measured-distance differences, which are differences between a plurality of measured distances, are determined, and the robot 10 is controlled in such a way that all or at least selected one of the first to fourth measured-distance differences comes close to the target value.

Accordingly, for example, in a case where the surface of the target object W is a simple curved surface or a complex curved surface, or in a case where the surface is uneven, or in a case where the posture of the tool T has to be changed according to various positions on the target object W, the posture of the tool T may be accurately adjusted to the actual surface shape of the target object W, according to the position of the tool T with respect to the target object W.

Furthermore, in the present embodiment, after the posture control process of controlling the posture of the tool T with respect to the target object W is performed in step S1-5, step S1-5 is repeated until all or at least selected one of the first to fourth measured-distance differences measured in step S1-6 falls in the reference range. The posture of the tool T may be even more accurately adjusted to the actual shape of the target object W by such repetition of step S1-5.

In the present embodiment, the first to fourth measured-distance differences are determined by changing a combination of a plurality of measured distances, and the posture control process is performed in step S1-5 without using one or some measured-distance differences (in the present embodiment, the fourth measured-distance difference) that exceed a predetermined threshold, among the first to fourth measured-distance differences. Accordingly, although a detection obstacle such as a foreign substance, a material or an object that causes reflection which is different from normal reflection, or unevenness is sometimes present on the surface of the target object W, and the value(s) of one or some measured-distance differences (in the present embodiment, the fourth measured-distance difference) may be greatly different from others, an influence of such a detection obstacle may be reduced or eliminated.

Additionally, in a case where there are one or some measured-distance differences (in the present embodiment, the fourth measured-distance difference) that exceed a predetermined threshold, the controller 31 may issue a notification to the effect (perform a notification operation) by using a notification device such as the display device 32 or a speaker. A measure may thus be taken, for example, to remove a detection obstacle according to the frequency or the like of the notification operation, and there is an advantageous effect that the accuracy of posture control for the tool T is increased.

In the present embodiment, the surface of the target object W is a spherical surface having specific curvature, and thus, the same target value is used for the first to fourth measured-distance differences. However, a target value may be provided for each of the first to fourth measured-distance differences, and the controller 31 may transmit a control signal to each servo controller 34 in step S1-5 such that the first to fourth measured-distance differences come close to respective target values. Each target value is set according to the three-dimensional shape data 33d, the position of each sensor 20a, 20b, 20c, 20d with respect to the tool T, and the like.

According to such a configuration, even in a case where the surface of the target object W is a curved surface with varying curvature, or where the surface of the target object W is uneven, for example, the posture of the tool T may be accurately adjusted to the actual surface shape of the target object W, according to the position of the tool T with respect to the target object W.

When the posture of the tool T is accurately adjusted as described above to the actual surface shape of the target object W, the task of tightening the screw S into the hole by the tool T may be smoothly performed, and also, a desirable fastened state is achieved for the screw S that is screwed in the hole. In other words, if the screw S is screwed in a state where a center axis of the screw S is inclined by a predetermined angle or more with respect to a center axis of the hole, an external thread of the screw S is possibly not meshed smoothly with an internal thread formed to the hole, and a fastening task may be obstructed, and the fastened state of the screw S may be affected. The posture of the tool T is important in terms of preventing such an inconvenience.

In the present embodiment, use of four 20a, 20b, 20c, 20d is indicated. Alternatively, the measured-distance differences may be obtained by using only three sensors 20a, 20b and 20c among the four sensors 20a, 20b, 20c, 20d, and the posture of the tool T may be controlled in such a way that the measured-distance differences come close to the target value. The same advantageous effect as described above is also achieved in this case.

A configuration is also possible according to which only one sensor 20a is used, and a sensor movement device for moving the sensor 20a around the rotation axis RA of the tool T is provided, where the sensor 20a is arranged at three or more positions around the rotation axis RA by the sensor movement device, and a distance between the sensor 20a and the target object W (a distance between each of a plurality of measurement reference positions and the target object W) is measured at each position. The same advantageous effect as described above is also achieved in this case.

Additionally, the present embodiment indicates insertion and tightening of the screw S into the hole by the tool T. It is also possible to form a plurality of holes where the screws S are to be inserted and screwed, on the surface of the target object W by a tool such as a drill held by the tool T. Also in this case, processing accuracy of a hole that is formed on the surface of the target object W may be increased by accurately adjusting the posture of the tool T to the actual surface shape of the target object W. Furthermore, accurate adjustment of the posture of the tool T to the actual surface shape of the target object W is also advantageous from the standpoint of increasing accuracy of a task, efficiency and the like, in the case of performing other tasks such as other processes, painting and inspection on the target object W by the tool T.

In the present embodiment, use of the robot 10 having a plurality of joints as the tool support device is indicated. Alternatively, the tool T may be supported by a robot having a single joint, a movable table capable of moving along an X-axis and a Y-axis and a robot having a single joint that is placed on the movable table, a movable table capable of moving along an X-axis, a Y-axis and a Z-axis, or the like, and these may be used as the tool support device. The same advantageous effect as described above is also achieved in this case.

The present embodiment indicates the tool posture control apparatus that controls the posture of the tool T to reduce an angle formed by the rotation axis RA of the tool T and the normal of the surface of the target object W. In the case where a hole is provided on the surface of the target object W, obliquely with respect to the normal of the surface, and the screw S has to be inserted and screwed into the hole, posture control may be performed on the tool T so as to reduce an angle formed by a center axis of the hole and the rotation axis RA of the tool T.

Figure 6:
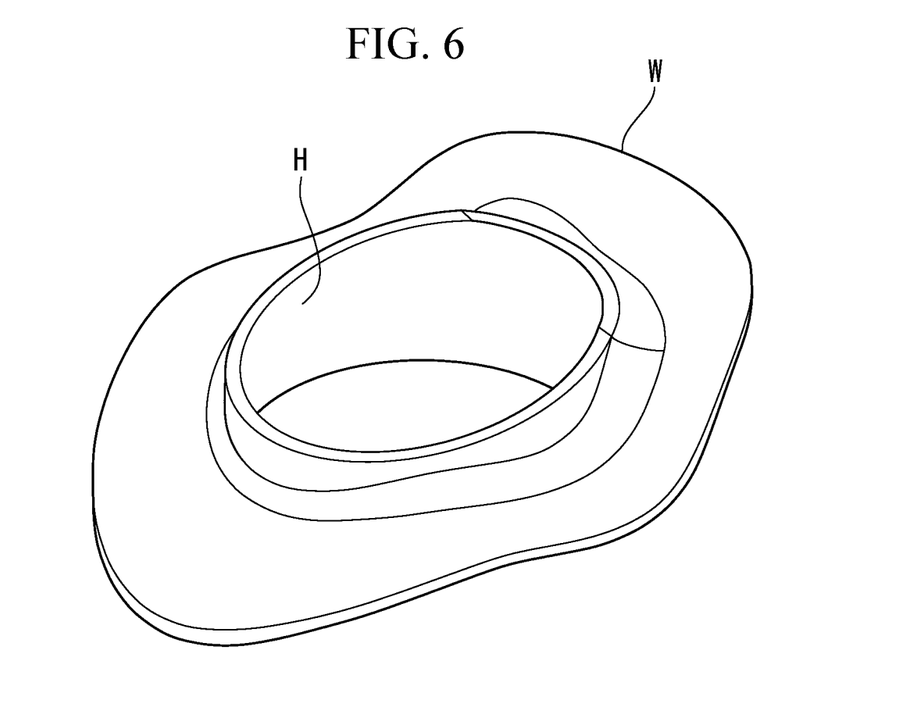
FIG. 6 is a perspective view of a target object used in a first modification of the present embodiment.
Figure 7:
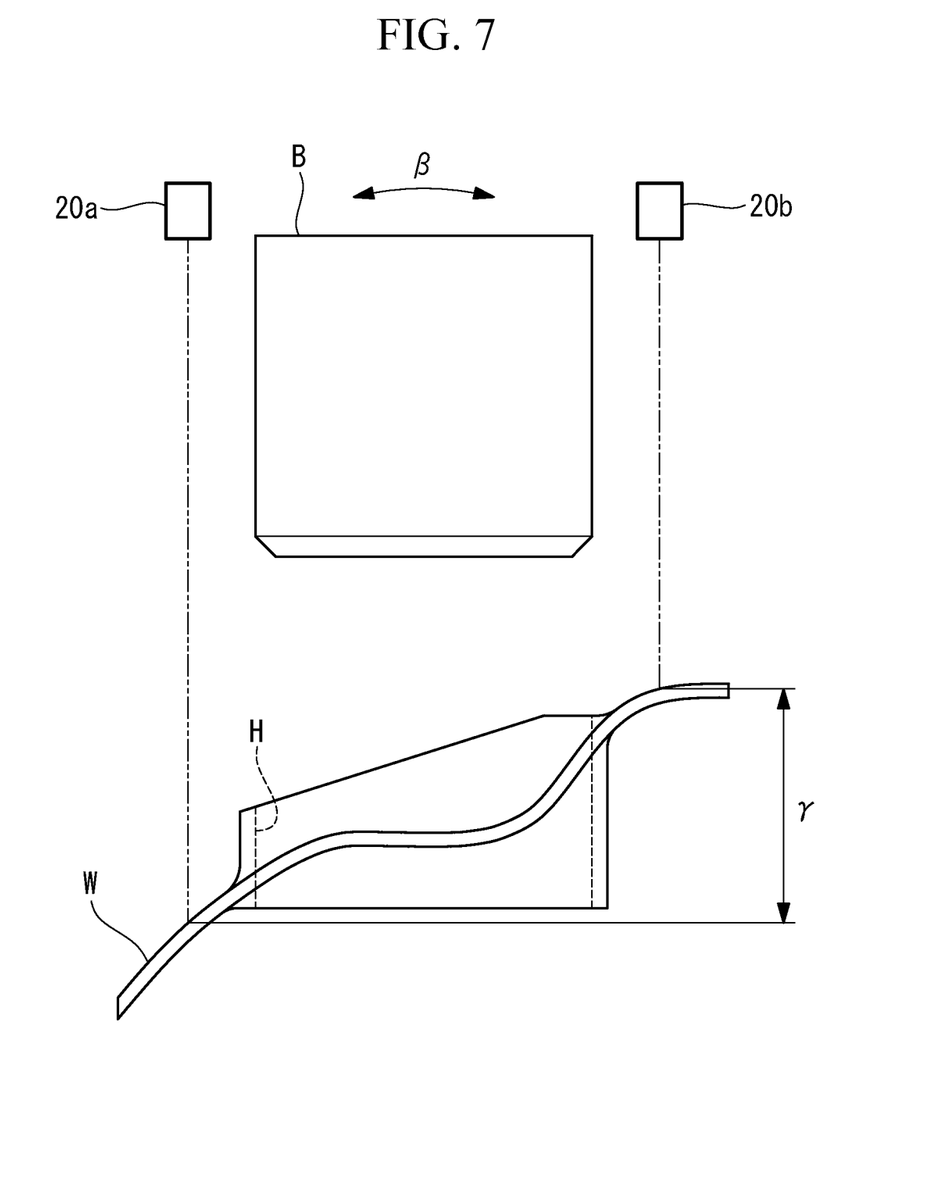
FIG. 7 is a diagram showing an example of calculation of inclination of a tool according to the first modification of the present embodiment.

An example of such control of the posture of the tool T is shown in FIGS. 6 and 7. In this example, a hole H is provided on the target object W, and the robot 10 inserts a part B that is held by the tool T into the hole H of the target object W.

As shown in FIG. 7, a center axis of the hole H extends in a direction which is not perpendicular to the surface of the target object W. In this case, as described above, the controller 31 transmits a control signal to each servo controller 34 such that the measured-distance difference between the sensors 20a, 20b aligned in the X-axis direction, for example, comes close to a target value y that is according to a result of calculation based on the three-dimensional shape data of the target object W. The same process is performed also with respect to the Y-axis direction. An inclination β of the part B with respect to the hole H is thereby placed within an appropriate range.

Figure 8:
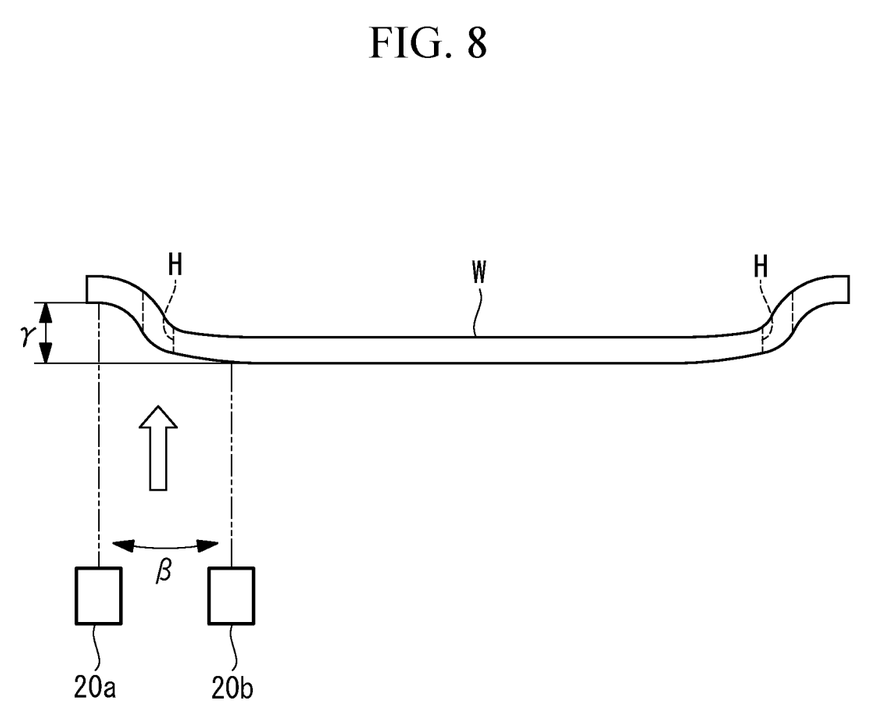
FIG. 8 is a diagram showing an example of calculation of inclination of a tool according to a second modification of the present embodiment.

Another example of control of the posture of the tool T is shown in FIG. 8. In this example, a hole H is provided on the target object W, and the robot 10 adjusts the posture of the tool T or of an object held by the tool T to the hole H.

As shown in FIG. 8, the controller 31 transmits, as described above, a control signal to each servo controller 34 such that the measured-distance difference between the sensors 20a, 20b aligned in the X-axis direction, for example, comes close to a target value y that is according to a result of calculation based on the three-dimensional shape data of the target object W. The same process is performed also with respect to the Y-axis direction. An inclination β of the tool T or the object with respect to the hole H is thereby placed within an appropriate range.

The following aspects of the present invention are derived from the aforementioned disclosure.

A tool posture control apparatus according to an aspect of the present invention includes a tool support device which supports a tool for performing a predetermined task on a target object, the tool support device capable of changing posture of the tool; a sensor supported by the tool support device; and a control device which changes the posture of the tool by controlling the tool support device, wherein the sensor measures distances between the target object and three or more measurement reference positions around the tool, respectively, and the control device performs a posture control process of controlling the tool support device in such a way that a measured-distance difference that is a difference between the distances measured by the sensor comes close to a target value that is determined according to a result of calculation based on three-dimensional shape data of the target object.

In the aspect described above, the distance between the target object and each of the three or more measurement reference positions is measured by the sensor that is supported around the tool by the tool support device, the measured-distance difference that is a difference between the measured distances is determined, and the tool support device is controlled in such a way that the measured-distance difference comes close to a target value that is determined according to a result of calculation based on the three-dimensional shape data of the target object, and thus, for example, in a case where a surface of the target object is a simple curved surface or a complex curved surface, or in a case where the surface is uneven, or in a case where the posture of the tool has to be changed according to various positions on the target object, the posture of the tool may be accurately adjusted to an actual surface shape of the target object, according to the position of the tool relative to the target object.

In the aspect described above, preferably, after performing the posture control process, the control device repeats the posture control process until the measured-distance difference falls within a reference range. When the posture control process is repeated until the measured-distance difference falls within a reference range, the posture of the tool may be even more accurately adjusted to an actual shape of the target object.

In the aspect described above, preferably, in the posture control process, the control device determines a plurality of the measured-distance differences by changing a combination of the distances that are measured, and also controls the tool support device in such a way that the plurality of the measured-distance differences each come close to a respective target value that is determined according to a result of calculation based on the three-dimensional shape data of the target object.

According to such a configuration, even in a case where the surface of the target object is a curved surface with varying curvature, or where the surface of the target object is uneven, for example, the posture of the tool may be accurately adjusted to the actual surface shape of the target object in accordance with movement of the tool relative to the target object.

In the aspect described above, preferably, in the posture control process, the control device determines a plurality of the measured-distance differences by changing a combination of the distances that are measured, and also performs the posture control process without using one or some measured-distance differences that exceed a predetermined threshold, among the plurality of the measured-distance differences.

In this case, although a detection obstacle such as a foreign substance, a material or an object that causes reflection which is different from normal reflection, or unevenness is sometimes present on the surface of the target object, and the value(s) of one or some measured-distance differences may be greatly different from others, an influence of such a detection obstacle may be reduced or eliminated.

In the aspect described above, preferably, in a case where part of or all of the plurality of the measured-distance differences exceed the predetermined threshold, the control device causes a notification device to perform a predetermined notification operation.

A measure may thus be taken, for example, to remove a detection obstacle as described above according to the frequency or the like of the notification operation, and there is an advantageous effect that the accuracy of posture control for the tool is increased.

According to the aforementioned aspects, posture of a tool may be accurately adjusted to an actual surface shape of a target object.

The invention claimed is:

1. A tool posture control apparatus, comprising:
a tool support which supports a tool for performing a predetermined task on a target object, the tool having a rotation part, the tool support capable of changing posture of the tool;
a plurality of optical displacement sensors supported by the tool support;
a controller which changes the posture of the tool by controlling the tool support; and
a storage,
wherein the plurality of sensors measures distances between the target object and a plurality of measurement reference positions around the tool, respectively,
wherein actual measurement values of distances between irradiation positions which are irradiated by the plurality of sensors are stored in the storage, and
wherein the controller performs a posture control process of controlling the tool support in such a way that an angle of a rotation axis line of the rotation part of the tool with respect to the target object comes close to a target value that is not perpendicular and that is determined according to three-dimensional shape data of the target object, the angle is obtained based on a measured-distance difference that is a difference between the distances measured by the plurality of sensors and the actual measurement values of distances stored in the storage.

2. The tool posture control apparatus according to claim 1, wherein after performing the posture control process, the controller repeats the posture control process until the measured-distance difference falls within a reference range.

3. The tool posture control apparatus according to claim 1, wherein in the posture control process, the controller determines a plurality of the measured-distance differences by changing a combination of the distances that are measured, and also controls the tool support in such a way that the plurality of the measured-distance differences each come close to a respective target value that is determined according to a result of calculation based on the three-dimensional shape data of the target object.

4. The tool posture control apparatus according to claim 1, wherein in the posture control process, the controller determines a plurality of the measured-distance differences by changing a combination of the distances that are measured, and also performs the posture control process without using one or some measured-distance differences that exceed a predetermined threshold, among the plurality of the measured-distance differences.

5. The tool posture control apparatus according to claim 4, wherein in a case where part of or all of the plurality of the measured-distance differences exceed the predetermined threshold, the controller causes a notification device to perform a predetermined notification operation.

6. A tool posture control apparatus, comprising:
a tool support which supports a tool for performing a predetermined task on a target object, the tool having a rotation part, the tool support capable of changing posture of the tool;
a single sensor supported by the tool support;
a sensor mover which moves the sensor around a rotation axis line of the rotation part of the tool; and
a controller which changes the posture of the tool by controlling the tool support,
wherein the sensor measures distances between the target object and three or more measurement reference positions around the tool, respectively, by moving the sensor with the sensor mover, and
wherein the controller performs a posture control process of controlling the tool support in such a way that a measured-distance difference that is a difference between the distances measured by the sensor comes close to a target value that is determined according to three-dimensional shape data of the target object.

* * * * *